(12) United States Patent
Alderson

(10) Patent No.: US 7,484,174 B2
(45) Date of Patent: Jan. 27, 2009

(54) METHOD FOR INTEROPERATION BETWEEN LEGACY SOFTWARE AND SCREEN READER PROGRAMS

(75) Inventor: Graham Richard Alderson, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 10/475,906

(22) PCT Filed: Mar. 11, 2002

(86) PCT No.: PCT/GB02/01106

§ 371 (c)(1),
(2), (4) Date: Oct. 27, 2003

(87) PCT Pub. No.: WO02/088916

PCT Pub. Date: Nov. 7, 2002

(65) Prior Publication Data

US 2004/0145607 A1 Jul. 29, 2004

(30) Foreign Application Priority Data

Apr. 27, 2001 (GB) ................................. 0110326.6

(51) Int. Cl.
*G06F 3/00* (2006.01)
(52) U.S. Cl. ................... 715/746; 715/744; 715/865
(58) Field of Classification Search .................. 715/744, 715/746, 865
See application file for complete search history.

(56) References Cited

U.S. PATENT DOCUMENTS 5,675,752 A * 10/1997 Scott et al. .................. 715/866

5,734,863 A 3/1998 Kodosky et al.

(Continued)

FOREIGN PATENT DOCUMENTS

EP 0620521 3/1994

(Continued)

OTHER PUBLICATIONS

Raggett, "Clean up your Web pages with HTML TIDY", Oct. 22, 2002, W3C, http://web.archive.org/web/20021022061855/http://www.w3.org/People/Raggett/tidy/.*

*Primary Examiner*—Tadesse Hailu
*Assistant Examiner*—Alvin H Tan
(74) *Attorney, Agent, or Firm*—Joseph E. Bracken; Winstead, P.C.

(57) ABSTRACT

A method for facilitating operation of a screen reader with legacy programs whose user interface definitions do not conform to the design guidelines expected by the screen reader program. A graphical user interface is analyzed to identify a logical sequence of user interface elements within the interface. A sequence of user interface elements within a definition of the user interface is compared with the identified logical sequence to identify any required reordering of the elements to conform to the identified logical sequence. The required reordering of the elements is performed to conform to the identified logical sequence. The comparing step includes comparing the sequence of user interface elements within the definition of the user interface with a set of predefined rules for user interface definitions, and, responsive to identifying non-conformance with a rule requiring a specific user interface control, an instance of the required user interface control is generated.

7 Claims, 7 Drawing Sheets

U.S. PATENT DOCUMENTS

| | | | |
|---|---|---|---|
| 5,893,127 A * | 4/1999 | Tyan et al. | 715/513 |
| 6,144,377 A * | 11/2000 | Oppermann et al. | 715/744 |
| 6,320,602 B1 * | 11/2001 | Burkardt et al. | 715/817 |
| 6,334,157 B1 * | 12/2001 | Oppermann et al. | 719/310 |
| 6,404,442 B1 | 6/2002 | Hilpert, Jr. et al. | 345/727 |
| 6,469,712 B1 | 10/2002 | Hilpert, Jr. et al. | 345/727 |
| 6,501,779 B1 * | 12/2002 | McLaughlin et al. | 372/52 |
| 6,789,075 B1 * | 9/2004 | Nielsen | 707/5 |
| 7,058,887 B2 * | 6/2006 | Cragun | 715/243 |
| 7,194,411 B2 * | 3/2007 | Slotznick et al. | 704/271 |
| 7,263,662 B1 * | 8/2007 | Ballard et al. | 715/762 |
| 2002/0054126 A1 * | 5/2002 | Gamon | 345/781 |
| 2002/0065822 A1 * | 5/2002 | Itani | 707/7 |
| 2002/0095440 A1 * | 7/2002 | Burgess et al. | 707/513 |
| 2002/0138250 A1 * | 9/2002 | Okura et al. | 704/2 |
| 2002/0156799 A1 * | 10/2002 | Markel et al. | 707/202 |
| 2002/0157084 A1 * | 10/2002 | Davis et al. | 717/5 |
| 2004/0139370 A1 * | 7/2004 | Bailey et al. | 714/38 |

FOREIGN PATENT DOCUMENTS

| | | |
|---|---|---|
| WO | WO0068769 | 11/2000 |

* cited by examiner

Figure 3

```
IDD_DEMO DIALOG DIALOGEX 0, 0, 317, 105
STYLE DS_MODALFRAME | WS_POPUP | WS_VISIBLE | WS_CAPTION | WS_SYSMENU
EXSTYLE WS_EX_APPWINDOW
CAPTION "Demo"
FONT 8, "MS Sans Serif"
BEGIN
    DEFPUSHBUTTON   "OK",IDOK,260,7,50,14
    EDITTEXT        IDC_EDIT_1,91,7,86,15,ES_AUTOHSCROLL
    GROUPBOX        "Group",IDC_STATIC,7,46,185,52
    CONTROL         "Radio button 1",IDC_RADIO_1,"Button",BS_AUTORADIOBUTTON |
                    WS_GROUP | WS_TABSTOP,14,60,71,12
    CONTROL         "Radio button 2",IDC_RADIO_2,"Button",BS_AUTORADIOBUTTON |
                    WS_TABSTOP,14,79,72,12
    EDITTEXT        IDC_EDIT_2,91,28,86,15,ES_AUTOHSCROLL
    PUSHBUTTON      "&Fix",IDC_BUTTON_FIX,260,28,50,14
    RTEXT           "Static control 1",IDC_STATIC_1,7,10,71,12
    EDITTEXT        IDC_EDIT_3,91,59,86,15,ES_AUTOHSCROLL
    RTEXT           "Static control 2",IDC_STATIC_2,7,30,71,12
END
```

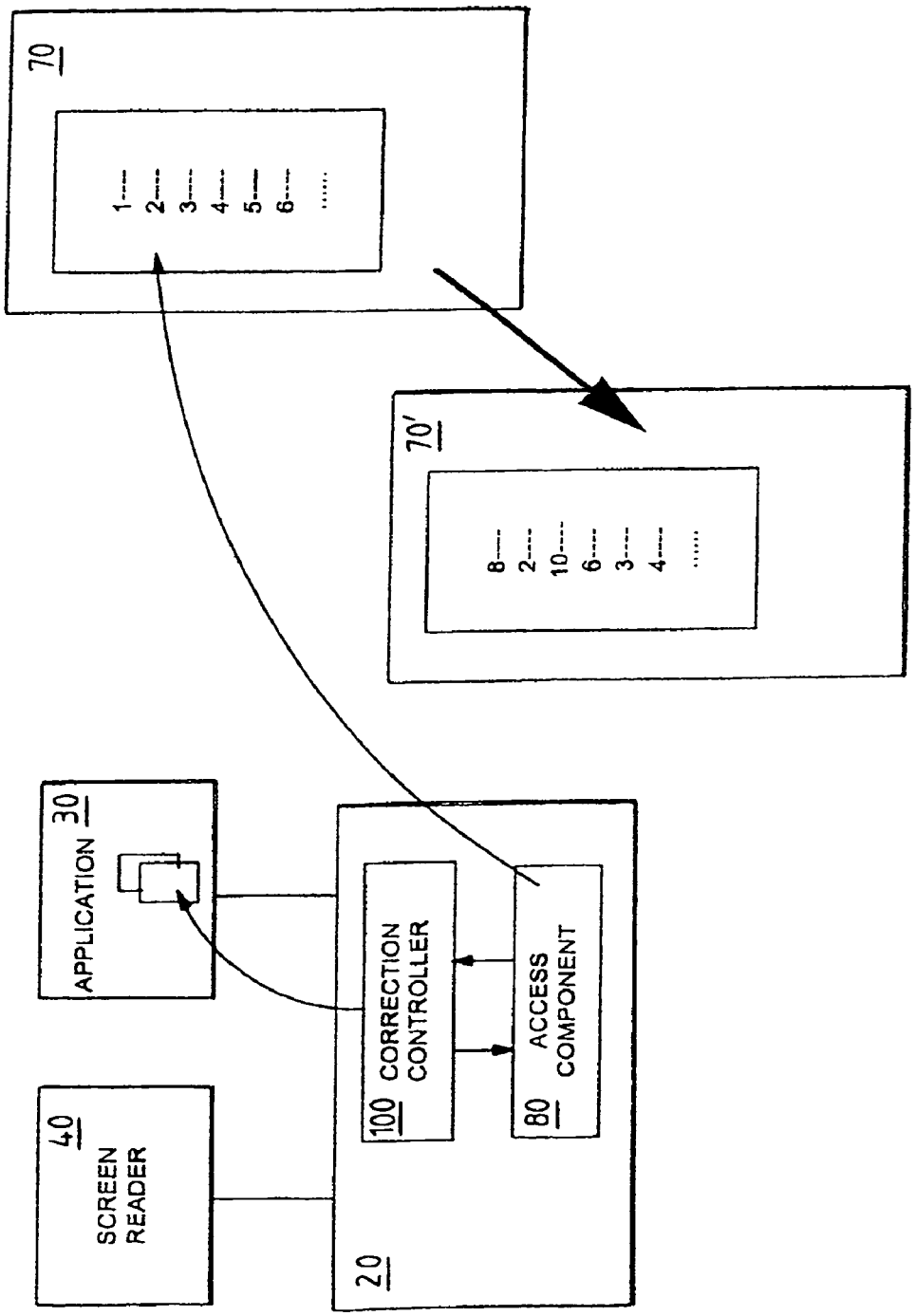

METHOD FOR INTEROPERATION BETWEEN LEGACY SOFTWARE AND SCREEN READER PROGRAMS

PRIORITY BENEFIT AND CROSS REFERENCE TO RELATED APPLICATIONS

This Application is a National Phase Application of International Application No. PCT/GB02/01106 filed Mar. 11, 2002 which application claims priority benefits to Great Britain Application Serial No. 0110326.6, filed Apr. 27, 2001, which is hereby incorporated by reference.

FIELD OF INVENTION

The present invention relates to the interoperation between accessibility-assistance programs, such as screen reader programs, and other computer programs and apparatus.

BACKGROUND

There has been increasing recognition in recent years of the need to design software products and Web pages with consideration for the needs of people with disabilities, to avoid excluding certain groups of individuals from access to information technology and information content. Recent legislation from the US and UK Governments and in other countries has made it mandatory to facilitate access to goods and services for disabled people, and this has emphasized the importance of software vendors and information providers moving towards more accessible software products. Furthermore, with appropriate solutions to accessibility issues, the World Wide Web internet service and information technology in general can provide a very useful service to blind and partially-sighted people which increases their self-reliance and their ability to proactively participate in information exchange.

One of the important ways a software product can be made accessible is for it to work correctly with screen reader programs. These programs read aloud information displayed on the screen, or convert screen information to Braille, so that users who are blind or partially sighted can access the software product. A number of GUI screen reader products are currently available, including Screen Reader/2™ from International Business Machines Corporation, Jaws™ for Windows™ from Henter-Joyce Inc., Winvision™ from Arctic Technologies Inc., and Outspoken™ for Windows from Berkeley Access. Many of these screen readers are able to read icons and other graphical objects. For example, the Outspoken screen reader converts dialog boxes, radio buttons and other graphical controls to audible output, and can be used with many application programs developed for the Windows operating system.

When a software product has dialogs or panels that require the user to enter data or other information, they typically have one or more lines of text describing the data to be entered, using a control known as a 'static text control', followed by an entry field where the user types the data (an 'edit control'). The screen reader software looks for the static text control immediately before the edit control, and reads this aloud to the user as a prompt as to what to enter at that point. The elements of the dialog or panel are typically defined in a file as an ordered list of controls, and the screen reader will usually read aloud the controls in the order in which they appear in this list. For the screen reader to read the dialog or panel in the correct logical order, the controls must be in this list in the correct order. For a typical screen reader to work correctly with prompts for entry fields, it is important that:

1) the prompt for the edit control is implemented using a static text control; and
2) the correct static text control is immediately before the edit control in the dialog or panel definition file.

Previous attempts to enable the operation of a screen reader have relied on providing "accessibility" guidelines for designers of user interfaces—if user interfaces are designed, or redesigned, to conform to the guidelines then the standard screen readers will be able to read and interpret graphic as well as text elements and to present them in the correct sequence.

However, legacy programs written before software vendors focussed on accessibility requirements of disabled people can have many dialog and panel definitions which do not meet these rules, and each definition may have been translated into many languages if the software products are sold in many different countries. Since the dialog or panel will usually appear visually correct whatever the order of the controls in the definition, the precise sequence only becomes significant when considering compatibility with screen reader programs. The legacy programs may also use controls other than static text controls as the prompt field for edit fields, for example a 'radio button' control which allows the user to choose only one from a range of choices—in this case an entry field may be used to enter a parameter only if a particular choice is made. A screen reader which is designed to read out the text of a static text control associated with an edit control will not work correctly if the prompt is a radio button control, and it will not read out elements in the correct order if the order of controls within a dialog or panel definition is incorrect.

For programmers to test and make changes to the order of controls or to add controls within all the dialog and panel definitions across multiple language versions of a complex software product to ensure correct operation of screen readers would be a long and error-prone task, and would be likely to result in dialogs and panels that were visually different from those that existing users are familiar with and which are shown in the product documentation.

U.S. Pat. No. 6,144,377 discloses an architecture for enabling an accessibility aid such as a screen reader program to access and manipulate user interface (UI) elements of an application program, including graphical elements such as edit boxes and buttons. According to U.S. Pat. No. 6,144,377, a screen reader is enabled to access the program code and data which implements a UI element, to examine and manipulate various characteristics of the UI element such as its location or text description. However, U.S. Pat. No. 6,144,377 includes no disclosure of the problem of a typical screen reader being unable to read screen information completely or in the correct order if the controls or the order of those controls within a user interface element definition is different from that expected by the screen reader.

SUMMARY

In a first aspect of the present invention, there is provided a method for facilitating operation of a screen reader comprising the steps of: analyzing a graphical user interface to identify a logical sequence of user interface elements within the interface; comparing a sequence of user interface elements within a definition of the user interface with the identified logical sequence to identify any required reordering of the elements to conform to the identified logical sequence; and performing the required reordering of the elements to conform to the identified logical sequence. The step of comparing the sequence of user interface elements within the definition of the user interface comprises comparing the sequence of user interface elements within the definition of the user interface with a set of predefined rules for user interface definitions, and, responsive to identifying non-conformance with a rule requiring a specific user interface control, the method further comprises the step of generating an instance of the required user interface control. The set of predefined rules comprises a rule requiring each edit control within a user interface definition to be immediately preceded by a static text control, and, responsive to identifying non-conformance with the rule, generating a new static text control adding the new control to the user interface definition. In response to the identification of non-conformance for an edit control, the method further comprises the following steps: generating a table including an identifier of the edit control, an identifier of the control which precedes the edit control, and a pointer to the new static text control, where the step of adding the new static text control to the user interface definition is performed in response to a command or message to initiate display of the user interface, identified logical sequence.

One application of this embodiment of the present invention is to add to a user interface definition file an invisible static text control immediately preceding any edit controls which are missing the expected static text control. The text for this static text control, which will be read out by a screen reader, can be extracted from whichever other user interface control had been used as a prompt for sighted users (for example, extracting the text label of a radio button if that was the visual prompt). An embodiment of the present invention for addressing this problem of edit controls which do not have static text controls will be described in more detail later.

Methods implementing the embodiments of the present invention may be implemented by computer programs, such as may be provided as computer program products comprising program code recorded on a machine-readable recording medium. Further aspects of the invention comprise program products and data processing apparatus incorporating means for implementing the invention.

BRIEF DESCRIPTION OF THE DRAWINGS

A better understanding of the present invention can be obtained when the following detailed description is considered in conjunction with the following drawings, in which:

FIG. 3 illustrates a definition file for a dialog box within the user interface of a legacy application program in accordance with an embodiment of the present invention;

FIG. 5 illustrates a correction controller component accessing UI element sequence lists and using an access component of an operating system to change the sequence of UI elements within a UI definition in accordance with an embodiment of the present invention.

DETAILED DESCRIPTION

Figure 1:
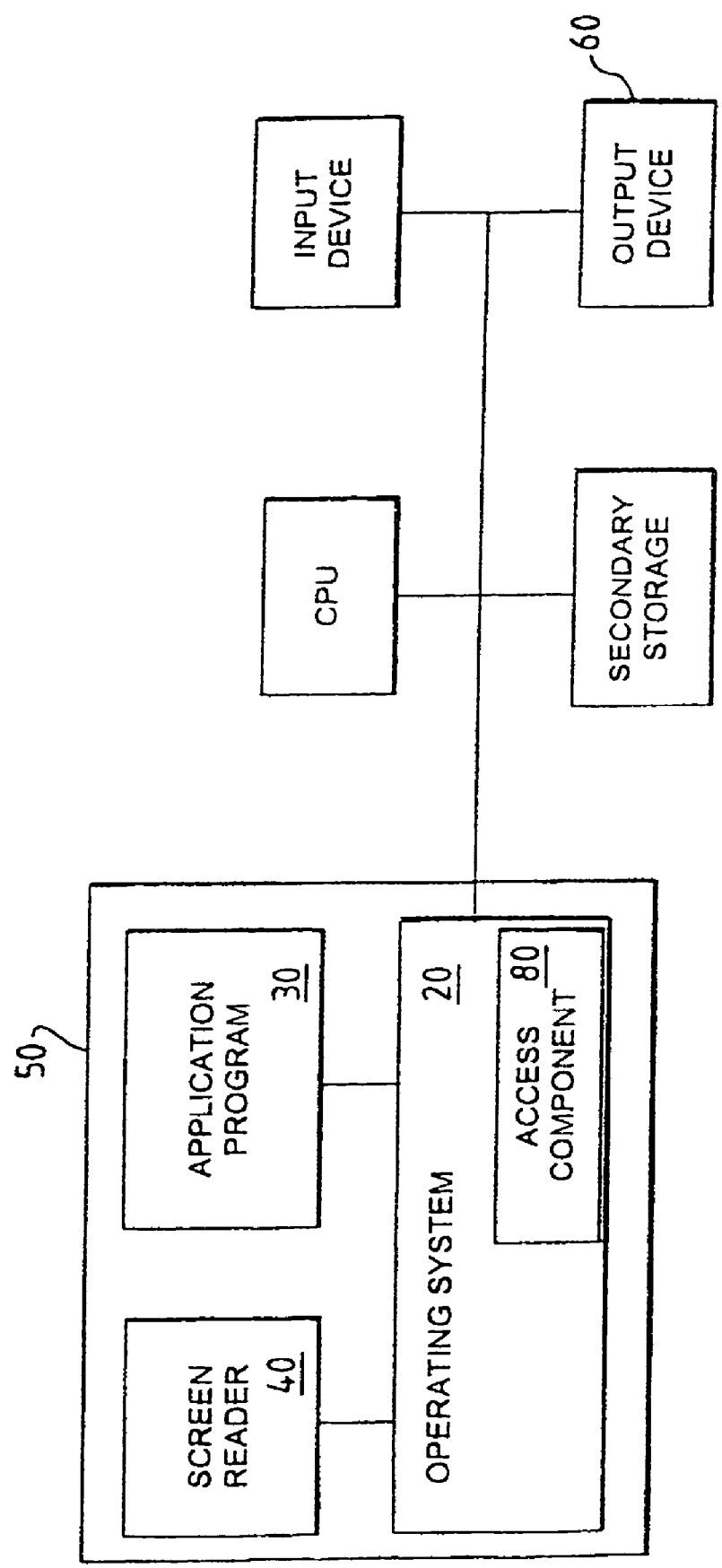
FIG. 1 illustrates an embodiment of a data processing system.

FIG. 1 is a schematic representation of a data processing system such as is well known in the art, in which a screen reader program 40 has been installed on the system to use functions of an operating system 20 to access the user interface elements of an application program 30 and to output information via an output device 60. As will be clear to persons skilled in the art, this is not limited to any particular data processing system or apparatus, or to any particular type of application program or to a specific operating system or screen reader. However, in order to describe a specific example implementation of the invention let us assume that the screen reader program is a typical screen reader program for a Windows operating system and is adapted to access the application program's user interface definition file which is held within the system memory 50 when the application program 30 is running on the system.

Figure 2:
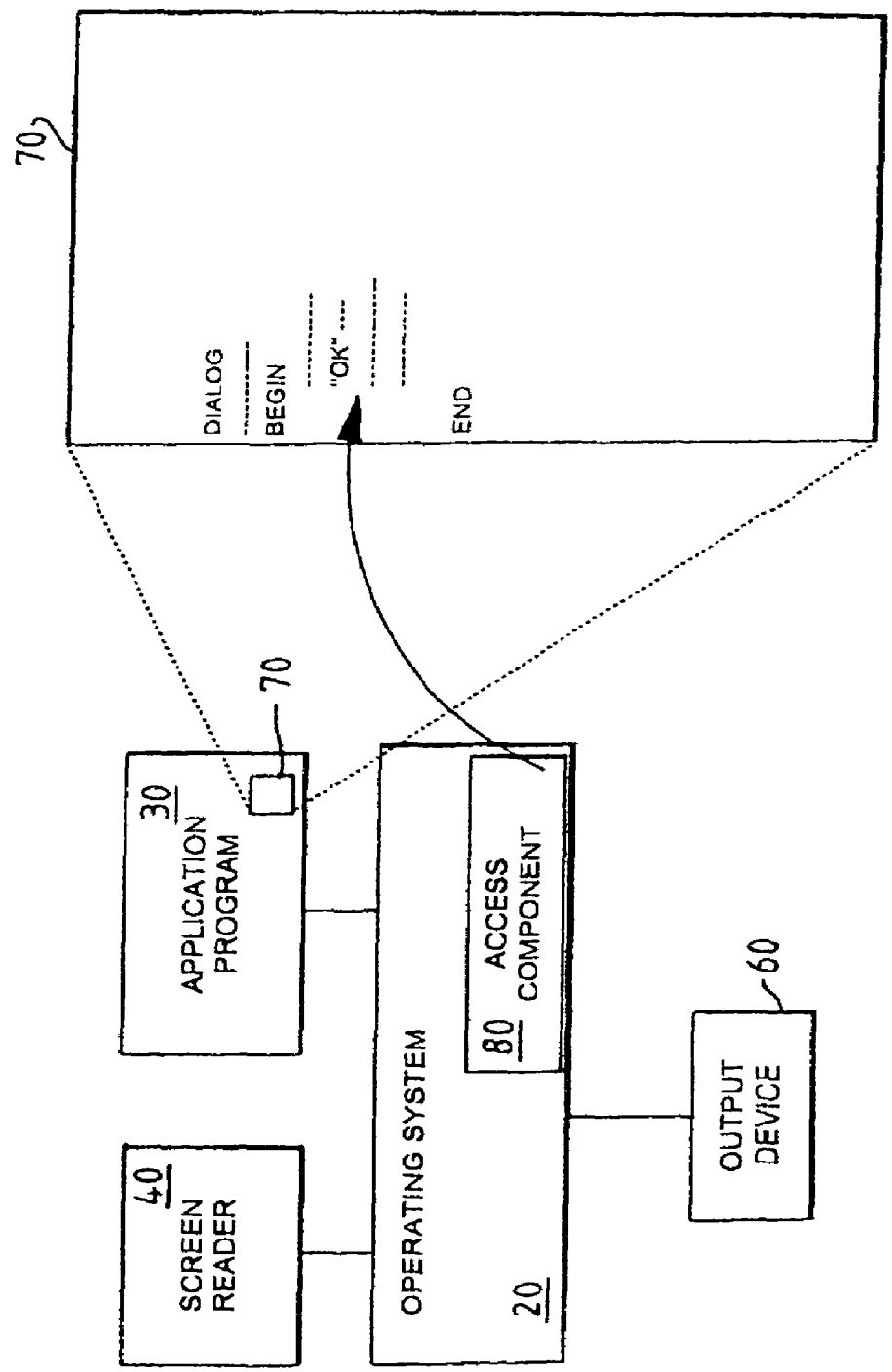
FIG. 2 illustrates an embodiment of a screen reader using the services of an operating system to access an interface definition file.

As shown in FIG. 2, a component of the operating system 20 accesses a binary format definition file 70 for a user interface of an application program 30 when creating user interface controls. A screen reader program 40 uses the resources of the operating system to access the definition 70 and to extract appropriate cues for presenting to the user. For example, let us assume that the screen reader extracts textual information from the user interface definition file using an access component 80 of the operating system 20, converts it to audio signals and outputs audible information via a speaker 60. The access component may, for example, implement the Accessibility Interface disclosed in U.S. Pat. No. 6,144,377.

As discussed above, typical screen reader programs only operate correctly to provide complete and correctly ordered audio information when the user interface controls have the correct sequence in the definition file. This is not always the case for legacy applications for which the user interface was created without consideration of the access requirements of blind and partially-sighted users.

Figure 4:
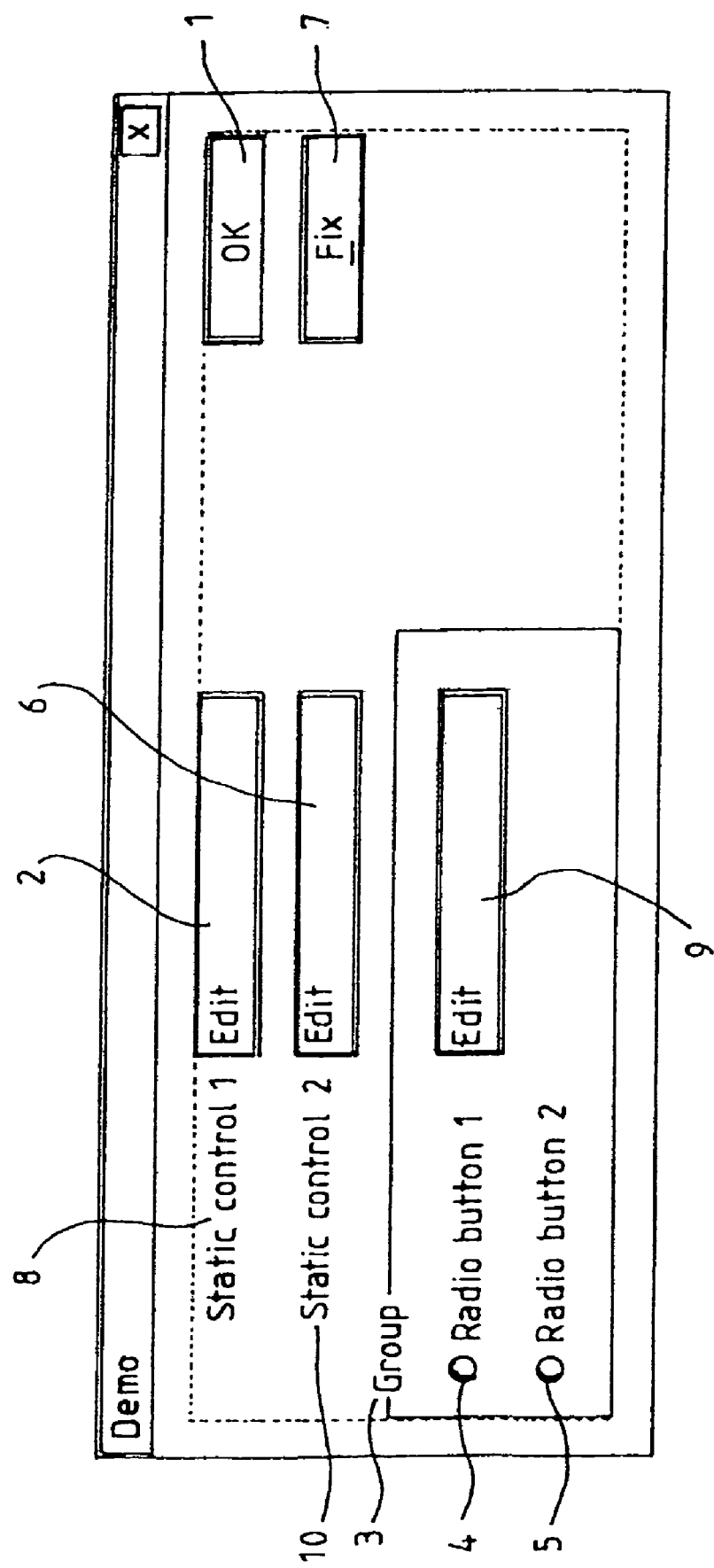
FIG. 4 illustrates a visual representation of the dialog box defined in FIG. 3, with an indication of the order in which they appear in the definition of FIG. 3, in accordance with an embodiment of the present invention.

An example definition of a user interface dialog box is shown in FIG. 3, and the corresponding visual representation of the dialog box is shown in FIG. 4. The elements of the dialog box, including edit fields, buttons and radio buttons, appear in the definition of FIG. 3 in a sequence other than the logical sequence of the dialog. This would be an acceptable approach to programming the interface since coordinate information within the definition determines the visual positions of each component without any consideration of their sequence within the definition. However, the numbering of elements 1 to 10 in FIG. 4 indicates the sequence in which the user interface elements will be read by a typical screen reader or other accessibility tool if the present invention is not used. The audible prompts provided by the screen reader will then only serve to confuse users, and no prompt will be provided for some edit fields. For example, referring to FIGS. 3 and 4, the prompts read to the user when the cursor is placed in each edit field are incorrect—for the first two edit fields no prompt will be read at all; and for the third edit field the prompt would be "Static control 1".

One solution to this problem is to manually recode all of the user interface component definitions within an application program to position user interface elements in the order expected by a screen reader and to ensure that required static text prompts are included. This would be a very time-consuming and error-prone task if the application program to be modified includes a complex user interface. Furthermore, this task will have to be repeated for each different language version of the interface.

An alternative solution implementing the present invention involves using program code to automatically modify the sequence of user interface elements within a user interface definition to present the elements to a screen reader in a sequence which conforms to the logical sequence of the visual representation of the interface. This modification of the definition is preferably implemented when a user interface component definition is provided to the operating system for display. At display time, the operating system is provided with information defining a required sequence (an ordered list of interface element identifiers) and is instructed to update the properties of the interface elements accordingly. The operating system retains this updated sequence information such that the sequence can be queried by a screen reader program—for example using an access interface such as described in U.S. Pat. No. 6,144,377.

Figure 6A:
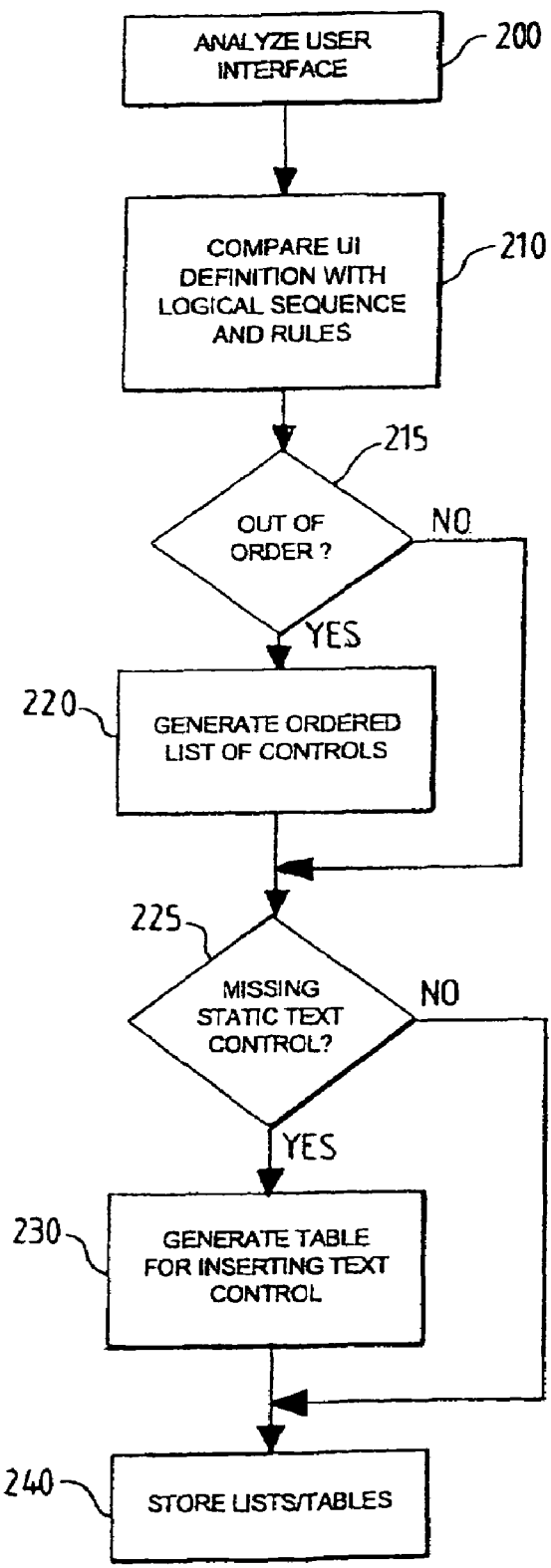
FIGS. 6A and 6B illustrate the sequence of steps of a method for processing user interface definitions according to an embodiment of the present invention.

This solution will now be described in more detail with reference to FIGS. 6A and B. Firstly, a user interface is analyzed 200, 210 to identify any elements of the dialogs, panels or windows within a user interface which do not conform to the user interface requirements of typical screen readers. One or two lists or tables are generated 220,230 for each faulty dialog or panel, depending on the problems with the existing definition. If the elements are not listed in the correct order (215), then a simple list or table is generated 220 which comprises a list of the interface component's interface element identifiers arranged in the correct order. This is then stored 240 in association with the interface component definition to enable subsequent reordering of elements. Secondly, if a dialog or panel includes edit controls such as entry fields with prompts displayed by controls other than static text controls (225), then a further list or table is generated 230 and stored 240. This table lists, as pairs, the identifier of the control used as the prompt and the identifier of the edit control and includes a pointer to a dynamically created user interface element, as will be described below.

The analysis 200 and list generation steps 220,230 described above can be performed manually by an interface programmer, and then subsequent automated steps of the method will use the lists to process the interface definition. However, in an alternative implementation, the initial analysis and list generation may be implemented by program code which compares the elements of a dialog box or panel with a set of approved interface layout templates or rules to automatically determine the logically correct sequence of elements. The program code which implements such an automation of list generation may be a programming tool used during program development (for example when creating new versions of a legacy program) or a component of an operating system which analyzes application programs at install time or application startup. The rules for ordering the user interface controls are generally well understood, having already been defined as part of the "accessibility" guidelines for designers of user interfaces. The rules for determining a logical sequence for a well designed interface can reuse the design guideline rules. For example, these rules will include simple instructions such as to read from left to right and top to bottom, to follow a text prompt with the associated edit field, or to read the full set of user interface elements within a group before stepping to other elements outside the group.

Figure 6B:
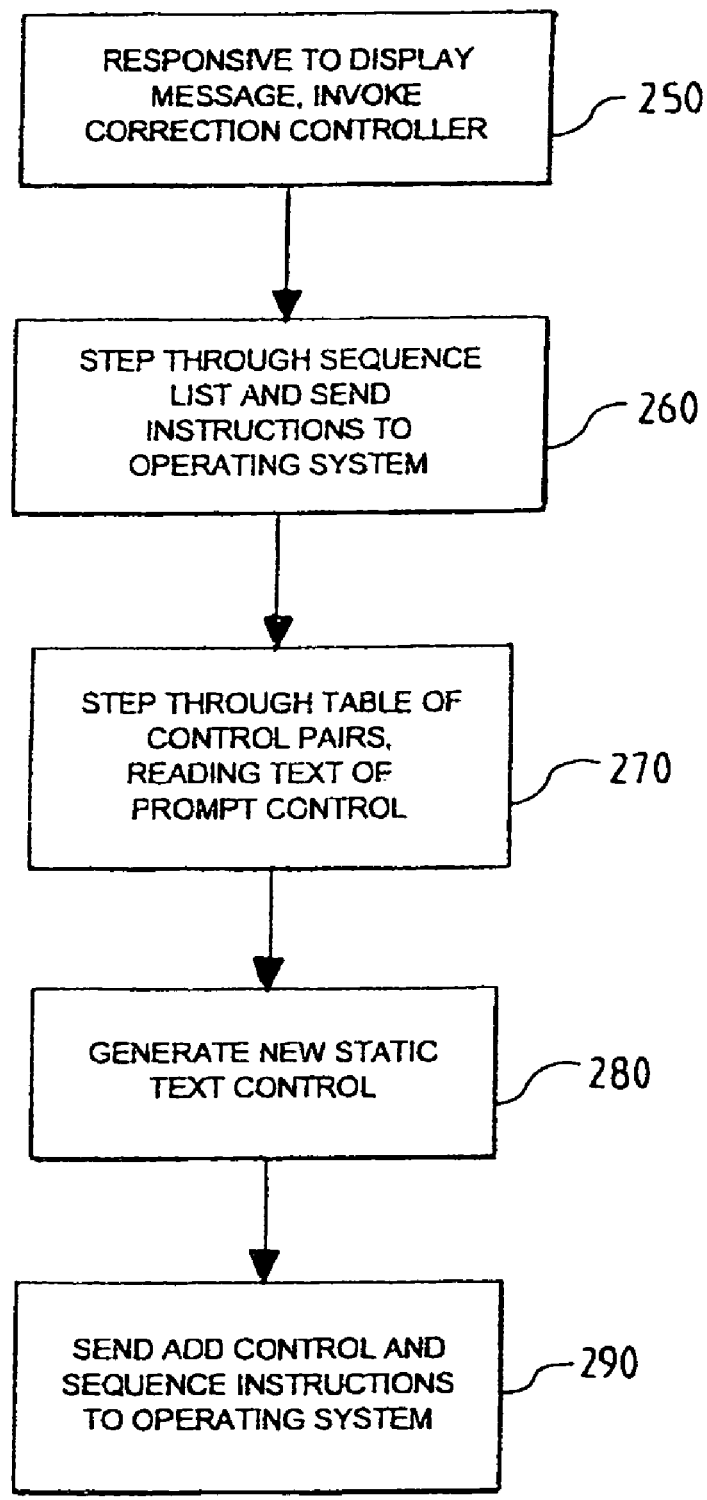

Subsequent to the steps of list generation, a further program code component (referred to hereafter as the correction controller 100, and shown in FIG. 5) is executed 250 when the dialog or panel is first displayed. Functions performed by the correction controller are shown in FIG. 6B. If the controls within the existing interface definition are out of order, this code component 100 steps through 260 the sequence list which was stored in association with the user interface definition file, instructing the operating system which control should follow the preceding one. This sequence information is effectively recorded as one of the properties of the user interface elements for subsequent interpretation by the operating system, although this may be implemented by the operating system separately storing the correct sequence information without changing the actual interface definition. This re-ordering is represented schematically in FIG. 5 as the move from user interface definition 70 to a re-ordered definition 70'.

In addition to the ordering problem, the example dialog box and definition of FIGS. 3 and 4 demonstrate an additional problem which arises from the way an accessibility interface is implemented in known operating systems. With certain operating systems, the prompt read for an edit field by an accessibility aid such as a screen reader is always taken from a static text field which must immediately precede the edit control. Even when the order of the elements is corrected using the correction controller 100 of the present invention, the third edit control shown in FIG. 4 is preceded by a radio button instead of a static text field, and this will result in no prompt or an incorrect prompt being read out by a screen reader.

To solve this problem, if there are edit controls with prompts that are not static controls, the correction controller component 100 steps through 270 the previously stored list or table of control pairs. It reads the location, size and text of the control that was formerly used as the prompt. It then dynamically creates 280 a static text control, with the same position, size and text; but which is invisible (i.e. its properties specify that it is not to be displayed in the visual representation of the interface). Finally the correction controller 100 instructs 290 the operating system that the new static text control should follow the original prompt control, and that the edit control should follow the new static text control, and the operating system updates the interface elements' properties to reflect this sequence.

An example implementation of the present invention will now be described in more detail, in which the correction of problems within a dialog or panel definition is performed at the time the dialog or panel is first displayed on a screen. To correct the ordering of elements in the dialog or panel, a simple list (or table) is required consisting of the numeric or symbolic identifiers of each element, in the desired order. For the example dialog shown in FIG. 4, this list might read:

IDC_STATIC_1,
IDC_EDIT_1,
IDC_STATIC_2,
IDC_EDIT_2,
IDC_RADIO_1,
IDC_EDIT_3,
IDC_RADIO_2,
IDOK,
IDC_BUTTON_FIX

A code fragment is invoked as the dialog or panel is first displayed (for the Microsoft Windows operating system, this is when the "WM_INITDIALOG" message is received by the application) to implement the following functions:

For each pair of identifiers in the list
    Call the operating system to order the second element after the first
Next pair To correct the problem of user interface elements other than a static text control preceding an edit control as the dialog or panel is displayed on the screen, a combination of a table and code using this table can also be used. The problem is solved by creating a hidden static text control dynamically in the same place as the other preceding control. The new static text control is given the same text as the other preceding control, and inserted in the order between the other preceding control and the edit control. When the dialog or panel is dismissed, this new static control is deleted. In an example implementation of this method, the following elements are needed for each affected edit control in the dialog or panel:

Identifier of the edit control
Identifier of the control that precedes the edit control
Whether the preceding control is a static text control
Pointer to the static text control dynamically created For the sample dialog shown in FIG. 4, this table might read:
{
{IDC_EDIT_1, IDC_STATIC_1, TRUE, NULL},
{IDC_EDIT_2, IDC_STATIC_2, TRUE, NULL},
{IDC_EDIT_3, IDC_RADIO_1, False, Null}
};

A code fragment which is run when the dialog or panel is first displayed implements the following functions:

```
For each row in the table
    If preceding control is a static control
        Call the operating system to ensure the edit control
    is after the preceding control
    Else
        Dynamically create a new static control
        Remember the its address in the table
        Read the text and position of the preceding control
        Set the new static control to have the same text and
position
        Set the new static control to be invisible
        Order the new static control after the preceding
control
        Order the edit control after the new static control
    End
Next row
```

Only one copy of the code fragments that make up the correction controller are required for the legacy application. As each dialog/panel/window is displayed, the correction controller is called with the address of the table that corrects the controls for that particular dialog/panel/window. Thus there is minimal increase to the size/complexity of the code in the legacy application and the task of generating the lists/tables is relatively simple to implement.

Embodiments of the invention provide the following advantages:
1) The definition files, which exist as one per national language, are left unchanged.
2) The changes required, i.e. the lists or tables, only have to be defined once per dialog/panel, not once per dialog/panel per national language version. The correction controller code can be common to all the dialogs/panels.
3) The verification/testing effort is considerably reduced compared with known alternatives—a dialog or panel checked in one national language should be correct in all languages as the code and tables are common to all languages.
4) The dialogs and panels remain visually unchanged, which means they will still match existing users expectations, and any pictures of the dialog or panel in the documentation.

The invention claimed is:

1. A method for facilitating operation of a screen reader, comprising the steps of:
    analyzing a graphical user interface to identify a logical sequence of user interface elements within the interface;
    comparing a sequence of user interface elements within a definition of the user interface with the identified logical sequence to identify any required reordering of the elements to conform to the identified logical sequence; and
    performing the required reordering of the elements to conform to the identified logical sequence;
    wherein the step of comparing the sequence of user interface elements within the definition of the user interface comprises comparing the sequence of user interface elements within the definition of the user interface with a set of predefined rules for user interface definitions and, responsive to identifying non-conformance with a rule requiring a specific user interface control, the method further comprises the step of:
    generating an instance of the required user interface control;
    wherein the set of predefined rules comprises a rule requiring each edit control within a user interface definition to be immediately preceded by a static text control, and wherein, responsive to identifying non-conformance with said rule, generating a new static text control adding the new control to the user interface definition;
    m response to said identification of non-conformance for an edit control, the method further comprises the following steps:
        generating a table including an identifier of the edit control, an identifier of the control which precedes the edit control, and a pointer to the new static text control;
        wherein the step of adding the new static text control to the user interface definition is performed in response to a command or message to initiate display of the user interface.

2. The method as recited in claim 1, wherein a text for the new static text control is extracted from the user interface element that immediately precedes the edit control within the identified logical sequence.

3. The method as recited in claim 1 further comprising the step of: setting properties of the new static text control to prevent its display within a visual representation of the user interface.

4. The method as recited in claim 1, wherein, in response to said comparing step, an ordered list of user interface element identifiers is generated to represent a required sequence of user interface elements.

5. The method as recited in claim 4, wherein said list is stored in association with said user interface definition and said step of performing the required reordering of the elements comprises modifying the user interface definition to implement the required sequence.

6. The method as recited in claim 1, wherein the step of performing the required reordering comprises modifying the user interface definition by adding sequence information as a property of the user interface elements.

7. The method as recited in claim 1, wherein the step of performing the required reordering is performed in response to a command or message to initiate display of the user interface.

* * * * *